(12) United States Patent
Schwörer et al.

(10) Patent No.: US 8,466,797 B2
(45) Date of Patent: Jun. 18, 2013

(54) HANDHELD DEVICE FOR INFRARED TEMPERATURE MEASUREMENT WITH SIMULTANEOUS IMAGE AND TEMPERATURE DISPLAY

(75) Inventors: Wolfgang Schwörer, Löffingen (DE); Frank Eder, Eggingen (DE); Kerstin Tetzlaff, Freiburg (DE)

(73) Assignee: Testo AG, Lenzkirch (DE)

( * ) Notice: Subject to any disclaimer, the term of this patent is extended or adjusted under 35 U.S.C. 154(b) by 471 days.

(21) Appl. No.: 12/674,697

(22) PCT Filed: Aug. 15, 2008

(86) PCT No.: PCT/EP2008/006729
§ 371 (c)(1),
(2), (4) Date: Jul. 9, 2010

(87) PCT Pub. No.: WO2009/024300
PCT Pub. Date: Feb. 26, 2009

(65) Prior Publication Data
US 2011/0121978 A1 May 26, 2011

(30) Foreign Application Priority Data
Aug. 23, 2007 (DE) .......................... 10 2007 039 788

(51) Int. Cl.
*G08B 17/00* (2006.01)
(52) U.S. Cl.
USPC .................... 340/588; 340/636.1; 340/870.28
(58) Field of Classification Search
USPC .............. 340/588, 589, 600, 636.1, 506, 521, 340/870.09, 870.17, 870.28
See application file for complete search history.

(56) References Cited

U.S. PATENT DOCUMENTS

| | | | |
|---|---|---|---|
| 4,071,957 A * | 2/1978 | Sumption et al. | 33/759 |
| 5,219,226 A * | 6/1993 | James | 374/124 |
| 6,185,989 B1 * | 2/2001 | Schulze | 73/64.51 |
| 6,753,966 B2 * | 6/2004 | Von Rosenberg | 356/432 |
| 2005/0174558 A1 | 8/2005 | Heinke et al. | |
| 2006/0114966 A1* | 6/2006 | Kienitz | 374/130 |
| 2009/0294671 A1* | 12/2009 | Baghai | 250/338.1 |

FOREIGN PATENT DOCUMENTS

| DE | 20 2005 015397 U1 | 2/2007 |
|---|---|---|
| DE | 20 2006 020449 U1 | 9/2008 |

* cited by examiner

*Primary Examiner* — Daniel Previl
(74) *Attorney, Agent, or Firm* — Hoffmann & Baron, LLP

(57) ABSTRACT

The invention relates to a handheld device (1) for infrared temperature measurement, comprising an infrared radiation detector (3) for measuring the temperature of a measuring spot (4) on an object under measurement (5), comprising an optical pickup device (2) for sensing the region containing the measuring spot (4) and comprising a display means (6) for presenting the measured temperature value. To provide a handheld device (1) which uses simple means to enable an operator to line up a measuring spot (4) on an object under measurement (5) and at the same time give the operator information on one or more ambient variables during this operation, it is proposed to design the display means (6) for continuously presenting the region of the object under measurement (5) that contains the measuring spot (4) and at least one item of temperature information that is correlated synchronously in time with the presentation.

25 Claims, 1 Drawing Sheet

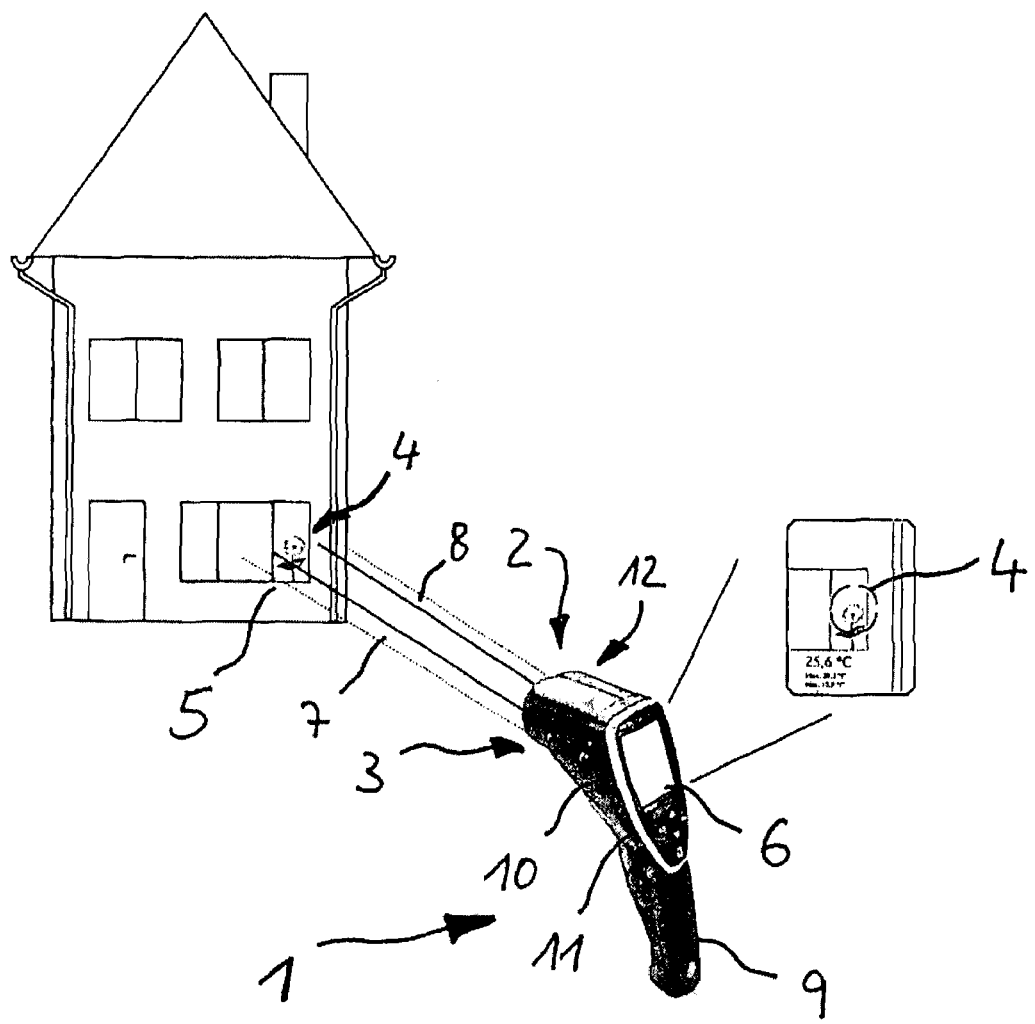

HANDHELD DEVICE FOR INFRARED TEMPERATURE MEASUREMENT WITH SIMULTANEOUS IMAGE AND TEMPERATURE DISPLAY

The invention relates to a handheld device for infrared temperature measurement, with an infrared radiation detector for the temperature measurement of a measurement spot on a measurement object, with an optical pickup device for sensing a region containing the measurement spot, and with display means for displaying the measured temperature value.

For quick and precise temperature measurements on larger or smaller areas of objects, non-contact infrared temperature measurement is increasingly being used. Compared with contact measurement methods, for example, through the use of thermocouples, significantly shorter measurement times can be achieved here and, in addition, the measurements are essentially free of wear, repercussions, and destruction. Here, infrared radiation emitted by the measurement object is focused by means of optics on a detector that generates, in turn, an electrical signal that corresponds to the radiation and that is then available for amplification and post-processing. Post-processed to an output parameter, the signal could then be displayed on display means or output analogously.

Here, the handheld devices mentioned above are already known and available in different configurations. First, for example, handheld devices are known in which an operator lines up the measurement spot to be detected on the measurement object through an optical sighting device on the handheld device and then reads a measured temperature value and assigns this value to the measurement spot in some way. For one, these devices make the measurement process time intensive and, second, they make measurements at locations that are difficult to reach impossible, because lining up the measurement object is not possible due to spatial reasons.

Other known handheld devices, for example, from DE 10 2005 018856 A1, project an image of the measurement spot onto the measurement object itself, in order to simplify the measurement for the operator, which, however, requires a correspondingly powerful projection device that makes the handheld device heavier, requires a certain amount of electrical power, and makes the device more expensive overall.

Finally, handheld devices are also known that record images of the measurement spot or an expanded region of the measurement object by means of a sensing device, e.g., a camera. These images indeed remain available on an interface after completion of a measurement process usually containing a plurality of measurement points and can be displayed at a later time, but then can be used neither for lining up the measurement object nor for linking with a then no longer associated measurement value of an environmental variable.

Therefore, the problem of the present invention is to disclose a handheld device that allows, with simple means, an operator to line up a measurement spot on a measurement object and that simultaneously allows the operator to access information on one or more environmental variables during this process.

This problem is solved by a handheld device of the type named above in which the display means is constructed for the continuous display of the region of the measurement object containing the measurement spot and at least one set of correlated temperature information time-synchronized with the display. In this way, an operator of the portable handheld device could directly detect the image of the measurement location, namely the measurement spot on the measurement object, through its display and simultaneously receives, so to speak, in real time, up-to-date information on the temperature prevailing at the measurement location. Because the image of the region with the measurement spot and the temperature information are simultaneously displayed on the display means, the operator no longer has to change his point of view when aligning the handheld device or recording the temperature information.

This simplifies the entire measurement process, because lining up the measurement object need not be continually interrupted for obtaining the temperature information, but instead the necessary information remains within the field of view of the operator the entire time. Indeed, in the state of the art, handhelds are already also known for infrared temperature measurement with a digital camera, for example, the infrared thermometer 576 by Fluke, with which photographs of the measurement object can be provided with additional information, for example, the capture time, for documentation after the measurement process. These devices, however, do not allow the operator, with simple means, to line up a measurement spot on a measurement object and simultaneously to have available information on one or more environmental variables during this process.

The information to be imparted by the display means to the operator can be displayed here, in an especially preferable way, by a screen, for example, an LC screen or a screen with organic diodes (OLED).

Advantageous handling of the handheld device while sighting the measurement object is given for an implementation of the handheld device in which the screen is arranged on a side of the handheld device approximately facing the operator in the position of use. If the operator targets the measurement object with the handheld device, then the display means lies, in most cases, exactly in his field of view, for example, when the measurement object is lined up along an extended arm. The display means, however, need not necessarily lie in the optical axis of a measurement unit of the handheld device.

The availability of the information provided by the display means is further increased by a refinement of the handheld device in which the display means can be adjusted in its position relative to the handheld device housing, in particular, about one or more pivot axes. The handheld device can then be easily aimed out the measurement object and can target this object, especially in the case of measurement objects that are difficult to access, without the information of the display means leaving the field of view of the operator.

In the case of a preferred refinement of the handheld device, the display means is separated or could be separated from this device and is in control connection with the handheld device, advantageously by means of a cable, so that the display means could also be arranged away from the rest of the handheld device. In this way, the person could move the handheld device and the display means independently of each other, which further simplifies the sighting process even in the case of inaccessible measurement objects. The control connection between the display means and the handheld device need not necessarily be realized by means of a cable, but instead could also be realized by means of a different connection type, for example, a radio connection.

One preferred embodiment of the invention is formed by a handheld device with a coupling part that can be detachably connected to a coupling counterpart arranged on the display means, so that the handheld device and display means are selectively either connected to each other or, if necessary, separated from each other.

Advantageously, the targeting process for the detection of the measurement object could be supported by the formation of the handheld device, which is why, in the case of one design of the invention, the handheld device with the display means has a grip part and a measurement unit preferably arranged at an obtuse angle relative to this grip part. With such a grip part constructed, for example, like a pistol grip, the portable handheld device is also, for one, easy to hold single-handedly and, second, the targeting direction can be easily specified and manipulated by the handling of the operator.

The targeting accuracy and quickness of the measurement process can be further increased in the case of one design of the handheld device in which the handheld device has at least one sighting device by means of which the extent of the measurement spot on the measurement object could be displayed on the display means, in particular, could be overlaid as marking on a screen of the display means, that is, the extent of the measurement spot could be overlaid on the display means preferably with sufficient contrast and could be immediately detected by the operator. In this way, the structural expense for a handheld device for infrared temperature measurement could be reduced, because a sighting device projecting the measurement spot onto the measurement object could optionally be completely eliminated.

Additionally or selectively, a refinement of the handheld device according to the invention could also have at least one sighting device by means of which the extent of the measurement spot could be projected onto the measurement object, that is, for example, a laser sighting device whose emitted laser beams can trace the measurement spot on the measurement object and thus, in addition, the measurement spot can be displayed to other people possibly present during the measurement.

In order to make available additional information on the environment of the measurement spot to the operator performing the measurement of the temperature of the measurement spot, in the case of a preferred refinement of the handheld device according to the invention, this device is provided with at least one sensor for detecting pressure, humidity, temperature, or similar environmental variables whose values could be correlated with the time-correlated images and/or temperature information and could be optionally displayed on the display means. In this way, this additional information could likewise be simultaneously made accessible to the operator.

For a later, possibly more exact evaluation and likewise for documentation purposes, it is advantageous if, in the case of another configuration of the handheld device, a digital storage device is provided for storing information, in particular, of images, temperature values, and/or other environmental variables, and this information can be retrieved at a different time than the time of its recording, can be displayed on the display means, and/or can be forwarded to an evaluation device. In the case of later playback of stored information of images and variables as a sequence, for example, development trends of variables could be visualized in a simple way.

The handheld device could also be used meaningfully for differentiating various measurement objects, in order to be able to distinguish measurement objects of different temperatures from each other or to be able to identify different qualities of a product at an early stage in the production process and to sort out inferior products. Therefore it is useful to provide one refinement of the handheld device with an alarm device that distinguishes various measurement objects with reference to values determined with the infrared detector or other sensors and that outputs a warning signal in the case of values deviating from a specified allowable range, in particular, such a warning signal is displayed on the display means or, for example, a control signal for further use is output.

In order to be able to supply the data recorded by the handheld device to another evaluation, storage, or archiving unit, it is advantageous if one design of the handheld device is provided with at least one analog and/or at least one digital interface for data exchange.

During the data exchange with the handheld device, if the reception point of the data is located away from the measurement location and if the measurement data should be immediately stored outside of the handheld device, for example, for security reasons, or if an evaluation of prior measurements is to take place already during additional measurements, then it is advantageous if the data of the handheld device could be transmitted quickly to the reception point. For this purpose, the interface of the handheld device or, in general, the handheld device, could be provided with a receiving/transmitting unit for managing a radio path whose counterpart is formed by the reception point. If the handheld device is not dependent on control signals or other signals on the side of the reception point, a design as a pure, switchable transmitting unit is also sufficient.

In order to be able to detect different measurement situations, in particular, in very different temperature ranges, with the handheld device, preferably the detector and optionally the optical pickup device can be detachably connected to the handheld device and can be exchanged in parts or as a module or measurement unit.

The invention will be explained below with reference to an embodiment and the drawing. In this drawing, a handheld device designated overall by 1 can be seen partially strongly schematized in a perspective view for infrared temperature measurement with an infrared radiation detector 3 for the temperature measurement of a measurement spot 4 on a measurement object 5. The measurement object 5 is here a building of which, in the drawing, one gable wall is shown in a planar view. The handheld device 1 has an optical pickup device 2 for sensing a region containing the measurement spot 4 and display means 6 for displaying the measured temperature value.

The display means 6 of the handheld device 1 according to the invention is constructed for the continuous display of the region of the measurement object 5 that contains the measurement spot 4 and at least one set of correlated temperature information that is time-synchronized with the display. In the drawing, this is symbolized by the broken lines that extend from the handheld device 1 aimed at the measurement object 5 to the measurement object 5, wherein these lines represent the field of view 7 of the optical pickup device 2. The field of view 7 of the optical pickup device 2 here completely encompasses the field of view 8 of the infrared radiation detector 2 of the handheld device 1 that is symbolized by the continuous lines extending from the handheld device 1 to the measurement object. The field of view 8 of the infrared radiation detector 2 here represents the measurement spot 4 on the measurement object 5.

The shown handheld device 1 aimed at the measurement object 5 in the position of use is provided with display means 6 that is turned in this position towards a person operating the handheld device 1. The display means 6 involves an LC screen whose displayed contents are shown at the right above the handheld device, indicated by the connecting lines. The handheld device 1 provided with the display means 6 also has a grip part 9 and a measurement unit 10 arranged at an obtuse angle to this grip part. For reasons of visibility, there is no illustration of pivot axes about which the display means 6 can be pivoted with respect to the handheld device 11.

In addition, a sighting device 12 that is not shown further is provided on the handheld device 1. By means of this sighting device 12, the extent of the measurement spot 4 on the measurement object 5 is displayed on the display means 6, as can be taken from the already mentioned illustration of the displays of the display means 6, and indeed as selectively overlaid marking on the screen of the display means 6. A true-size mapping of the region sensed by the optical pickup device 2, as well as the overlaying of the correlated temperature information, as well as additional information, is also to be taken from this illustration in which this information involves the extreme temperature values of the sensed region, as well as additional environmental variables, such as temperature, pressure, and humidity that are detected by additional sensors that are arranged on the handheld device 1 and that are not shown further.

The present invention consequently relates to a handheld device 1 for infrared temperature measurement with an infrared radiation detector 3 for the temperature measurement of a measurement spot 4 on a measurement object 5 with an optical pickup device 2 for sensing a region containing the measurement spot 4 and with display means 6 for displaying the measured temperature value. In order to disclose a handheld device 1 that allows, with simple means, an operator to line up a measurement spot 4 on a measurement object 5 and that simultaneously makes information on one or more environmental variables during this process accessible to the operator, the display means 6 is constructed for the continuous display of the region of the measurement object 5 containing the measurement spot 4 and at least one set of correlated temperature information time-synchronized with the display.

The invention claimed is:

1. Handheld device for infrared temperature measurement with an infrared radiation detector for the temperature measurement of a measurement spot on a measurement object, with an optical pickup device for sensing a region containing the measurement spot, with a display means for displaying the measured temperature value, said display means (6) being constructed for the continuous display of the region of the measurement object (5) containing the measurement spot (4) and at least one set of correlated temperature information time-synchronized with the display, and with a digital storage device for storing images of sensed regions and corresponding temperature values, said stored images of sensed regions and corresponding temperature values being selectively retrievable whilst stored.

2. Handheld device according to claim 1, characterized in that the display means (6) has at least one screen.

3. Handheld device according to claim 2, wherein said at least one screen is a liquid crystal screen.

4. Handheld device according to claim 2, wherein said at least one screen is a screen with organic diodes (OLED).

5. Handheld device according to claim 1, characterized in that the display means (6) is arranged on one side of the handheld device (1) turned approximately towards the operator in the position of use.

6. Handheld device according to claim 1, characterized in that the display means (6) can be adjusted in its position relative to a handheld device housing (11).

7. Handheld device according to claim 6, characterized in that the display means (6) is selectively separable from the handheld device housing (11).

8. Handheld device according to claim 7, characterized in that the display means (6) is in control connection with the handheld device housing (11) by a cable.

9. Handheld device according to claim 7, characterized in that the display means (6) is in control connection with the handheld device housing (11) by a radio connection.

10. Handheld device according to claim 6, characterized in that a coupling part that can be detachably connected to a coupling counterpart of the display means (6) is provided on the handheld device housing (11).

11. Handheld device according to claim 6, characterized in that the display means (6) is pivotable about one or more pivot axes.

12. Handheld device according to claim 1, characterized in that the handheld device (1) with the display means (6) has a grip part (9) and a measurement unit (10).

13. Handheld device according to claim 12, characterized in that the measurement unit (10) is arranged at an obtuse angel to the grip part (9).

14. Handheld device according to claim 1, characterized in that the handheld device (1) has at least one sighting device (12) by means of which the extent of the measurement spot (4) on the measurement object (5) can be displayed on the display means (6) with the measurement spot (4) being selectively overlaid on the measurement object (5).

15. Handheld device according to claim 1, characterized in that the handheld device (1) has at least one sighting device by means of which the extent of the measurement spot (4) can be projected onto the measurement object (5).

16. Handheld device according to claim 1, characterized in that the handheld device (1) has at least one sensor for detecting pressure, humidity, temperature, or similar environmental variables whose values can be assigned to the time-correlated images and/or temperature information.

17. Handheld device according to claim 16, characterized in that the sensor detected values are displayable on the display means (6).

18. Handheld device according to claim 1, characterized in that the handheld device (1) is provided with an alarm device that distinguishes various measurement objects (5) with reference to values determined with the infrared detector or other sensors and that outputs, in the case of values deviating from a specified allowable range, a warning signal.

19. Handheld device according to claim 18, characterized in that the warning signal is displayed on the display means (6).

20. Handheld device according to claim 1, characterized in that the handheld device (1) is provided with at least one analog and/or at least one digital interface for data exchange.

21. Handheld device according to claim 20, characterized in that the interface of the handheld device (1) is provided with a transmitting/receiving unit for operating a radio path.

22. Handheld device according to claim 1, characterized in that the detector (3) can be detachably connected to the handheld device (1) so as to be replaceable as a module or parts.

23. Handheld device according to claim 1, characterized in that the optical pickup device (2) can be detachably connected to the handheld device (1) so as to be replaceable as a module or parts.

24. Handheld device according to claim 1, characterized in that said stored images of sensed regions and corresponding temperature values are displayable on the display means (6) when retrieved from the digital storage device.

25. Handheld device according to claim 1, characterized in that said stored images of sensed regions and corresponding temperature values are transmittable to an evaluation device.

* * * * *

UNITED STATES PATENT AND TRADEMARK OFFICE
CERTIFICATE OF CORRECTION

| | | |
|---|---|---|
| PATENT NO. | : 8,466,797 B2 | Page 1 of 1 |
| APPLICATION NO. | : 12/674697 | |
| DATED | : June 18, 2013 | |
| INVENTOR(S) | : Schworer et al. | |

It is certified that error appears in the above-identified patent and that said Letters Patent is hereby corrected as shown below:

In the Claim

Column 6, claim 13, line 14, replace "an obtuse angel to" with --an obtuse angle to--.

Signed and Sealed this
Seventh Day of January, 2014

Margaret A. Focarino
*Commissioner for Patents of the United States Patent and Trademark Office*